US005176764A

United States Patent [19]
Abbott et al.

[11] Patent Number: 5,176,764
[45] Date of Patent: Jan. 5, 1993

[54] TIRE ASSEMBLY WITH INNER AND OUTER TIRES HAVING COOPERATING VENT COMPONENTS

[75] Inventors: John R. Abbott, Cuyahoga Falls; Roger A. Fleming, Stow; Wayne D. Maas, Copley; David L. King, Spencer, all of Ohio

[73] Assignee: The Goodyear Tire & Rubber Company, Akron, Ohio

[21] Appl. No.: 697,056

[22] Filed: May 8, 1991

[51] Int. Cl.⁵ .................. B60C 17/01; B60C 17/06
[52] U.S. Cl. .................. 152/158; 152/340.1; 152/518; 152/520
[58] Field of Search ............ 152/339.1, 340.1, 341.1, 152/342.1, 310, 313, 320, 322, 158, 544

[56] References Cited

U.S. PATENT DOCUMENTS

| | | | |
|---|---|---|---|
| 2,587,470 | 2/1952 | Herzegm | 152/544 |
| 2,825,383 | 3/1958 | Spelman | 152/544 |
| 2,874,744 | 2/1959 | Trainer | 152/342 |
| 2,900,005 | 8/1959 | Riggs | 152/341 |
| 2,917,096 | 12/1959 | Snyder | 152/341.1 |
| 2,934,127 | 4/1960 | Howard | 152/341.1 X |
| 2,969,824 | 1/1961 | Howard | 152/340 |
| 2,987,093 | 6/1961 | Urbon | 152/340 |
| 3,018,813 | 1/1962 | Koch et al. | |
| 3,025,902 | 3/1962 | Sanderson | 152/340 |
| 3,219,092 | 11/1965 | Howard | 152/340 |
| 3,915,774 | 10/1975 | Dobson | 156/113 |
| 4,015,652 | 4/1977 | Harris | 152/544 X |
| 4,209,051 | 6/1980 | Udall | 152/544 |
| 4,418,734 | 12/1983 | Dobson | 152/158 |
| 4,751,951 | 6/1988 | Dobson | 152/520 |
| 4,765,358 | 8/1988 | Cady | 137/223 |

FOREIGN PATENT DOCUMENTS 630561 2/1935 Fed. Rep. of Germany ...... 152/544

Primary Examiner—Geoffrey L. Knable
Attorney, Agent, or Firm—David L. King

[57] ABSTRACT

A tire assembly comprising outer and inner tires having at least one vent and one plug is described. The vents and plugs mate in the assembly providing an air tight seal in the bead seal region of the tires. The vents or plugs permit air to escape from the outer tire if an attempt is made to mount the outer tire on a rim without a mating inner tire.

11 Claims, 9 Drawing Sheets

TIRE ASSEMBLY WITH INNER AND OUTER TIRES HAVING COOPERATING VENT COMPONENTS

BACKGROUND OF THE INVENTION

This invention relates to an improvement in multi-chambered tires of the type comprising a tubeless outer tire and a tubeless inner tire combination or assembly.

Past designs of multi-chambered tire assemblies have utilized the concept of a tire within a tire. In the event of a loss of air pressure in the outer tire, a separate inner tire or shield was provided to carry the tire's load.

The combination of inner and outer tire divided the tire assembly into outer and inner chambers, the outer chamber being the space between the radially inner surface of the outer tire and the radially outer surface of the inner tire while the inner chamber was formed by the radially inner surface of the inner tire and the rim of the wheel. The chambers were typically inflated by dual inflation valves through which air passes into the inner tire through one valve and into the outer chamber via a second valve integrally mounted on the outer tire. Alternatively air pressure can be supplied through a valve that can selectively fill the inner tire and the outer tire. In normal operation the inner tire is generally inflated to a pressure higher than the outer tire.

U.S. Pat. No. 3,219,092 relates to a dual tire as described above. The patent issued Nov. 23, 1965 to the executors of inventor Frank A. Howard.

The Howard patent describes the problem of overstretching the beads of the outer tire when attempting to mount the tire assembly on the rim. The problem was exacerbated by the inner tire flanges which necessarily increase slightly the effective diameter of the bead seat portion of the rim. The overstretching of the beads increased the risk of breakage. Howard suggested use of a very thin inner tire or redesign the inner tire using fine wires that would embed in the outer tire bead area and thus eliminate bead stretching.

An alternative to the tire assembly described in the Howard patent is a design in which the bead seat diameter of the outer tire is increased to allow for the thickness of the inner tire flanges. This design modification eliminates overstretching of the beads of the outer tire. However, a concern with this design is that if the outer tire, without the mating inner tire, is mounted on a rim, inadequate bead tension could result. The tire would be susceptible to rapid deflation due to bead unseating.

Thus, a multi-chamber dual tire should not be mountable in the absence of its inner tire.

The tension in the bead of a mounted tire must be controlled, as must the force (inflation pressure) required to seat the bead on a wheel rim. These should not be significantly increased or decreased in a multi-chamber tire as compared to the normal single-chamber tire.

SUMMARY OF THE INVENTION

An improved multi-chamber tire assembly is described. The tire assembly includes an outer tire and an inner tire. The inner and outer tires have at least one vent and one plug which mate in the assembly.

A preferred embodiment of the tire assembly includes a tubeless pneumatic outer tire with an inner cavity and a tubeless pneumatic inner tire mounted in the cavity of the outer tire. The outer tire has a pair of axially opposed annular bead portions. At least one bead portion has a plurality of air vents integrally molded into the bead portion. The inner tire has a pair of annular flanges. The flanges encase or envelop the bead portion of the outer tire. At least one flange has vent plugs equal in number to the vents of the outer tire. The vent plugs are aligned with and seal the vents of the outer tire.

The vents or plugs of the outer tire permit air to escape from the outer tire if an attempt is made to mount the outer tire on a rim without a mating inner tire.

DETAILED DESCRIPTION OF THE INVENTION

The following definitions are applicable to this specification, including the claims:

"Axial" and "axially" are used herein to refer to lines or directions that are parallel to the axis of rotation of a tire and rim assembly;

"Bead portion" means that part of an outer tire or inner tire comprising an annular tensile member wrapped by ply cords and shaped, with or without other reinforcement elements such as flippers, chippers, apexes, toe guards and chafers, to fit the design rim;

"Inner" means toward the inside of the tire or tire and rim assembly and outer means toward its exterior; and "Radial" and "radially" are used to mean directions radially toward or away from the axis of rotation of the tire or tire and rim assembly.

Figure 1:
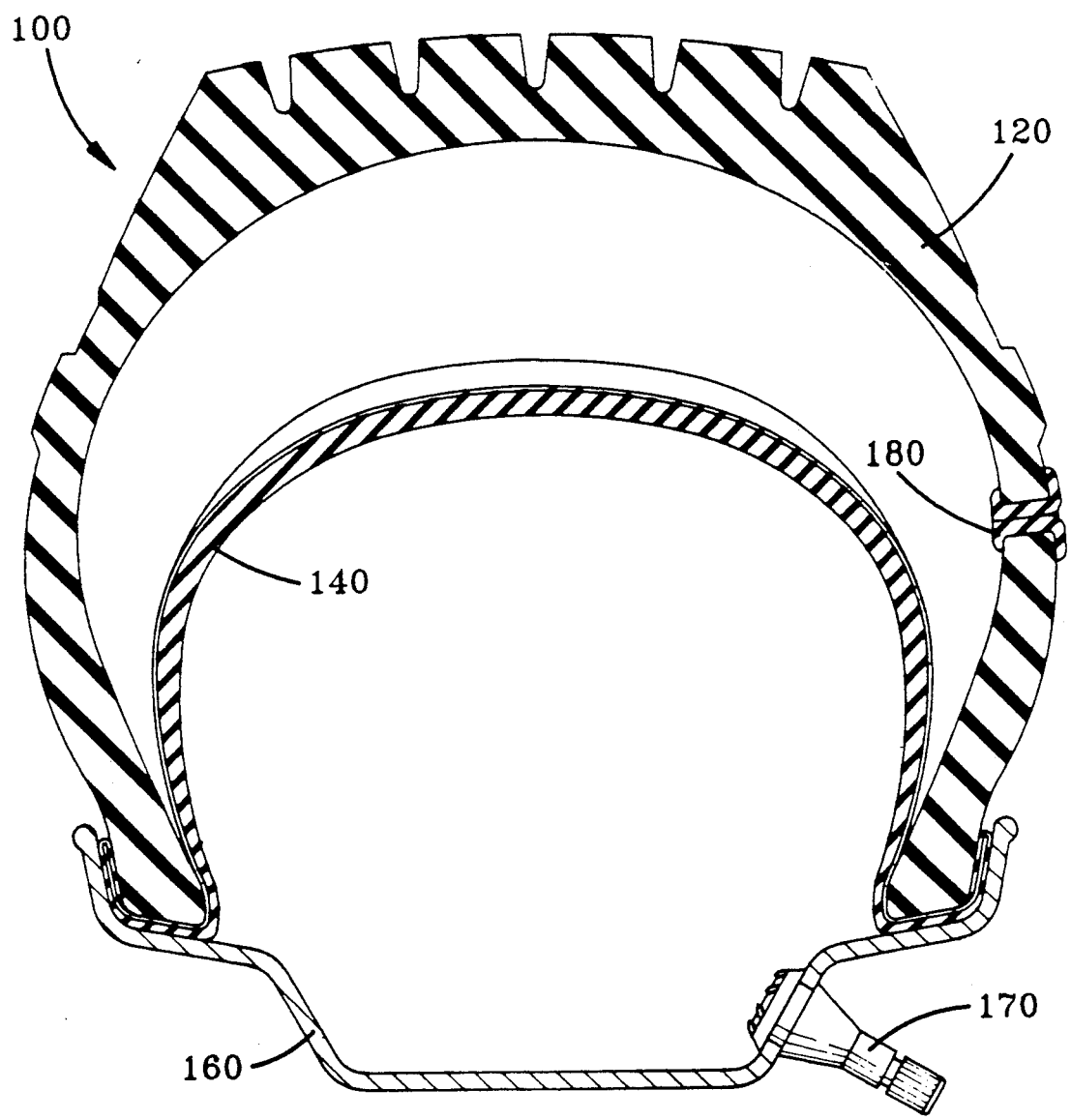
FIG. 1 is a cross-sectional view of the Frank A. Howard "safety tire" designated Prior Art.

With particular reference to FIG. 1 there is shown a cross-sectional view of a prior art tire and rim assembly generally designated by the numeral 100. The illustrated assembly is similar to those described in U.S. Pat. No. 3,219,092.

The tire and rim assembly 100 of FIG. 1 illustrates conventional mounting of an outer tire 120 and inner tire 140 onto a rim 160. A valve 170 is provided to permit air to fill the inner tire 140. A second valve 180 is attached to the outer tire 120 for air inflating of the outer tire.

Whether within the drawings, the specification, or the claims, like numerals or letters refer to like parts or dimensions in the several views.

Figure 4:
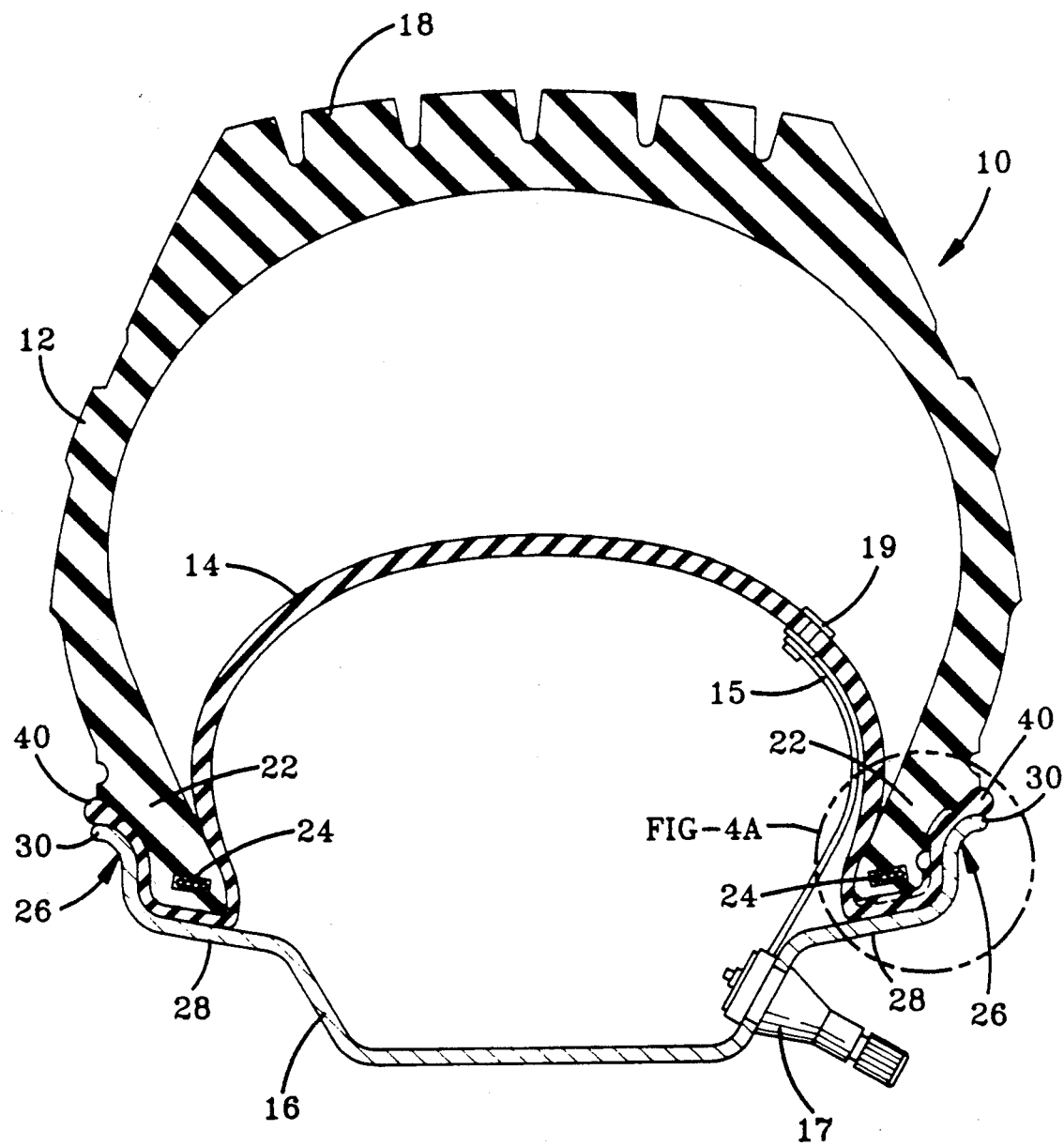
FIG. 4 is a cross-sectional plan view of the tire assembly of the invention mounted on a rim.
Figure 4A:
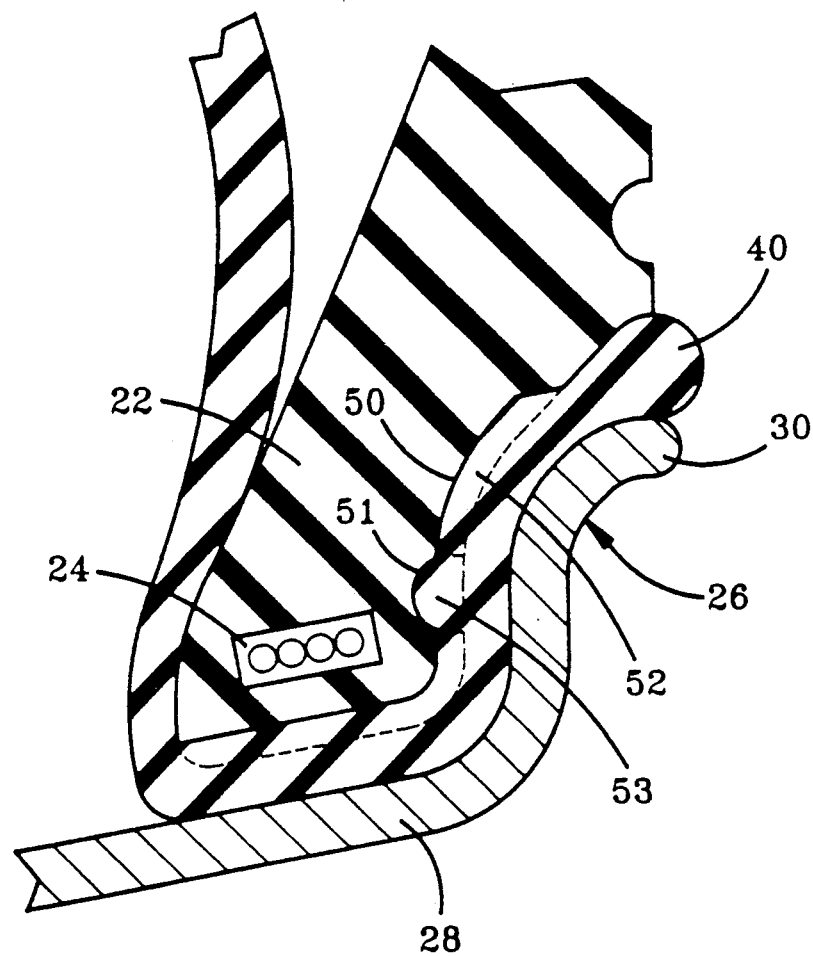
FIG. 4A is an enlarged view of a portion of a bead seal area of the tire assembly taken from the cross-sectional view of FIG. 4.

FIG. 4 is a cross-sectional view of a tire assembly of the present invention and is generally indicated reference numeral 10. The assembly 10 comprises a tubeless pneumatic outer tire 12 and a tubeless pneumatic inner tire 14, both of which are mounted on a rim 16. The outer tire 12 has a ground engaging tread 18 and a pair of axially spaced sidewalls each extending radially inwardly from the tread portion 18 to a respective bead portion 22. Each bead portion 22 has within it an annular tensile member 24.

The rim 16 has a pair of axially spaced annular bead seating portions 26 each having a base 28 and a radially outwardly extending flange 30.

The tubeless pneumatic inner tire 14 is located in the cavity formed between the outer tire 12 and the rim 16. The inner tire has a pair of annular flanges 40. The flanges 40 encase or envelop the bead portion of the outer tire and occupy the area adjacent the base 28 and radially outwardly extending flange 30 of the rim 16.

An air fill valve 17 is shown attached to the rim 16. The valve 17 permits air to pressurize selectively the inner and outer tires 14 and 12. The air fill valve can be rotated to create an air passage to the inner tire directly or can be turned to create an air passage through a tube 15 to a connection 19. The connection 19 commutes with the air chamber of the outer tire. The valve permits each chamber to be independently pressurized. A valve, as described above, is disclosed in U.S. Pat. No. 4,765,357.

Figure 2:
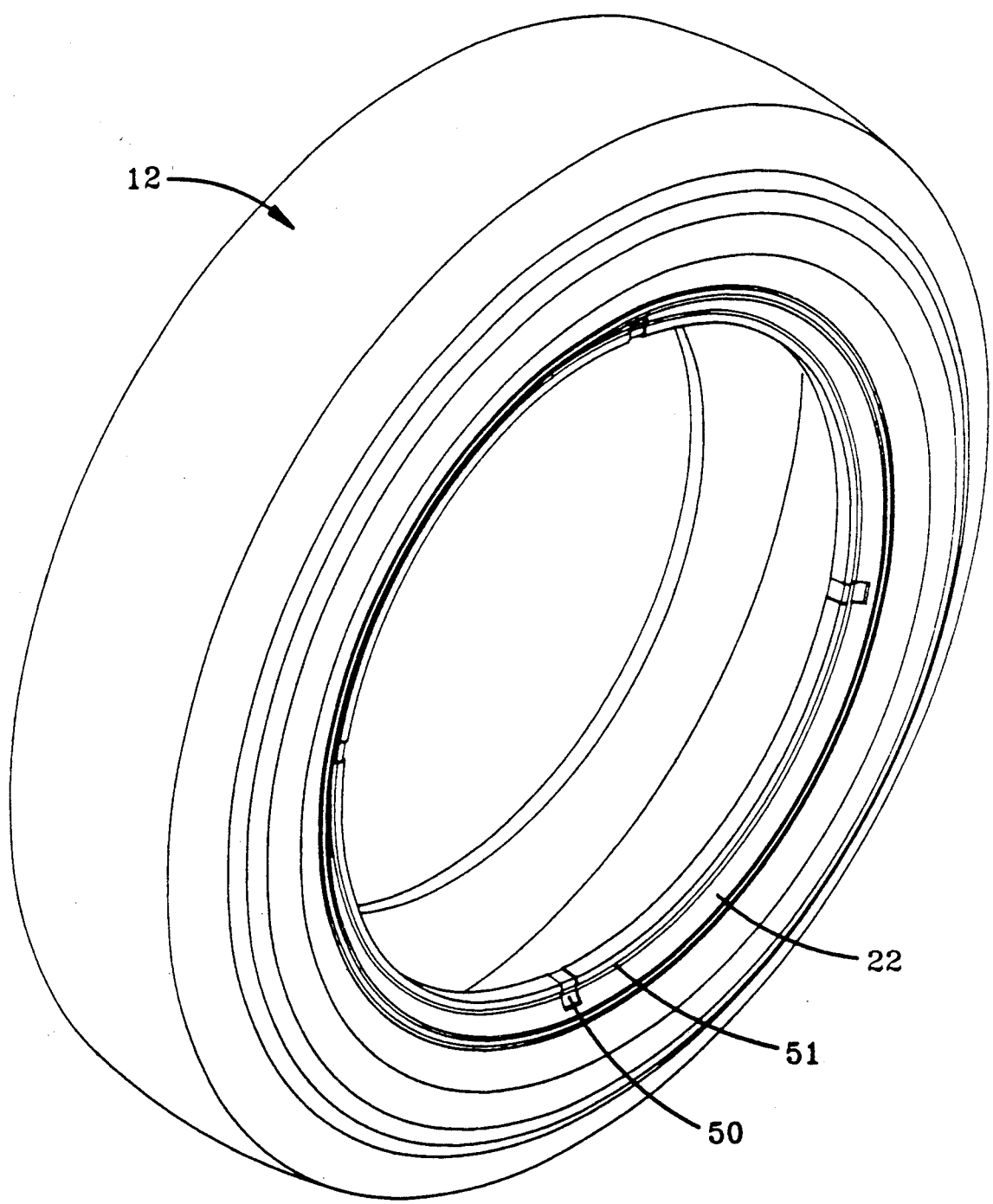
FIG. 2 is a perspective view of the outer tire of the invention.
Figure 5:
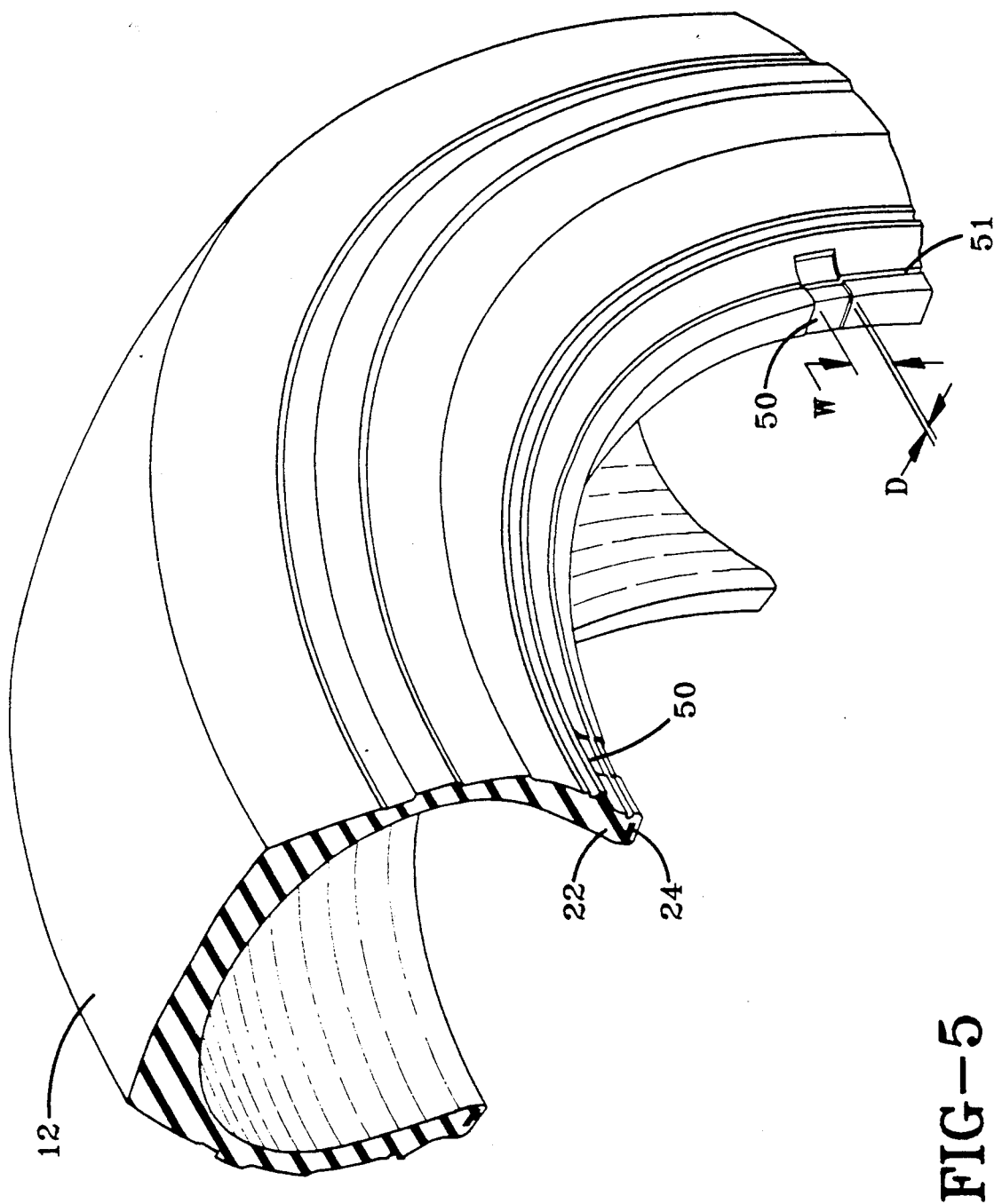
FIG. 5 is a partial perspective view of the outer tire of FIG. 2.

As illustrated in FIG. 2 and FIG. 5 the outer tire 12 has at least one bead portion 22 with a plurality of air vents 50 integrally molded into the bead portion 22.

In the preferred embodiment the vents of the outer tire include a circumferentially extending annular "O" ring seat 51. The "O" ring seat 51 intersects each of the vents 50 in a region of the bead portion 22 of the outer tire 12, the region being in an area that would radially align with the flange of a rim. The "O" ring seat 51 in the preferred embodiment is formed by a circumferentially continuous 0.08 inch radius at least 0.08 inches deep.

Figure 3:
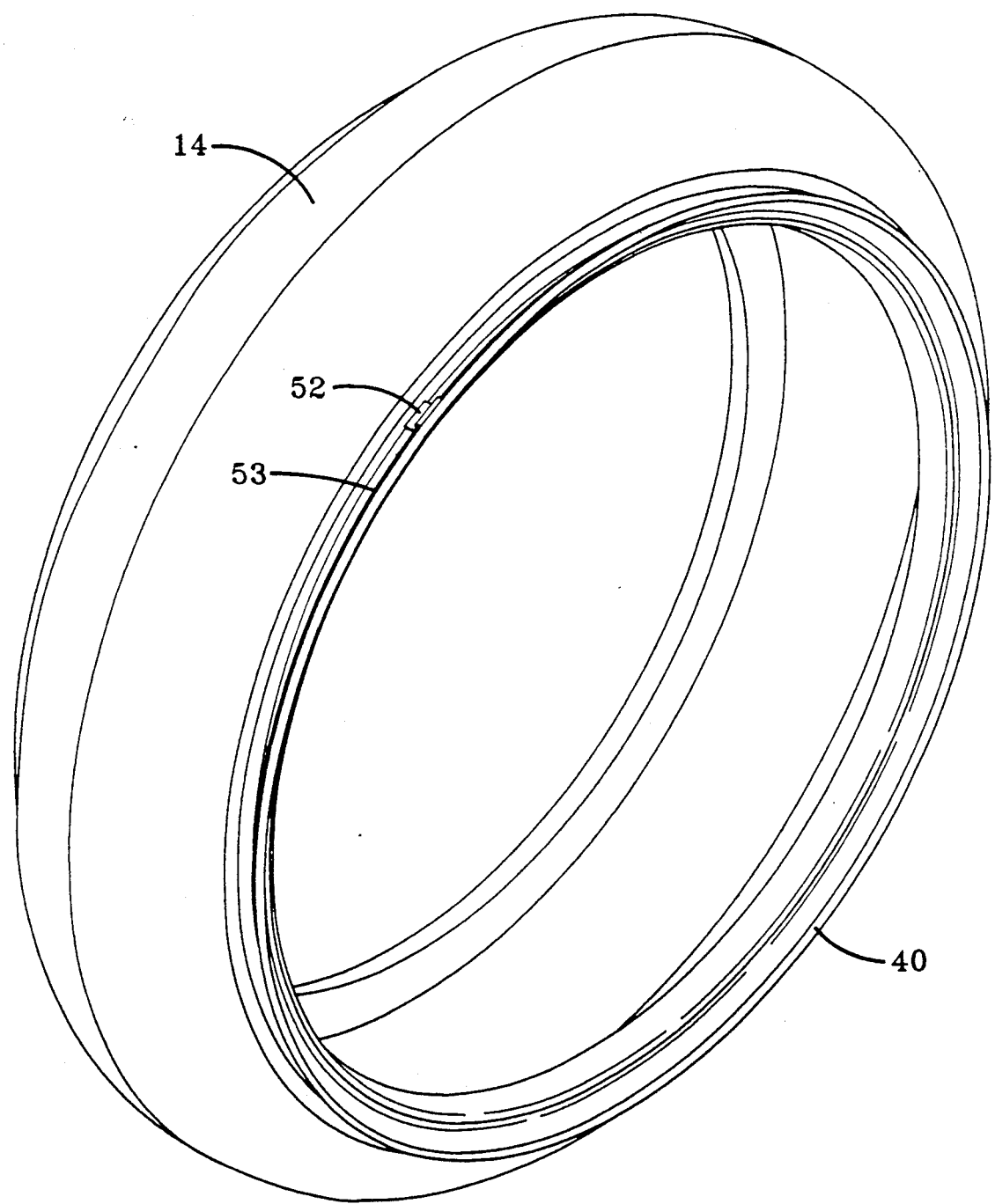
FIG. 3 is a perspective view of the inner tire of the invention.
Figure 6:
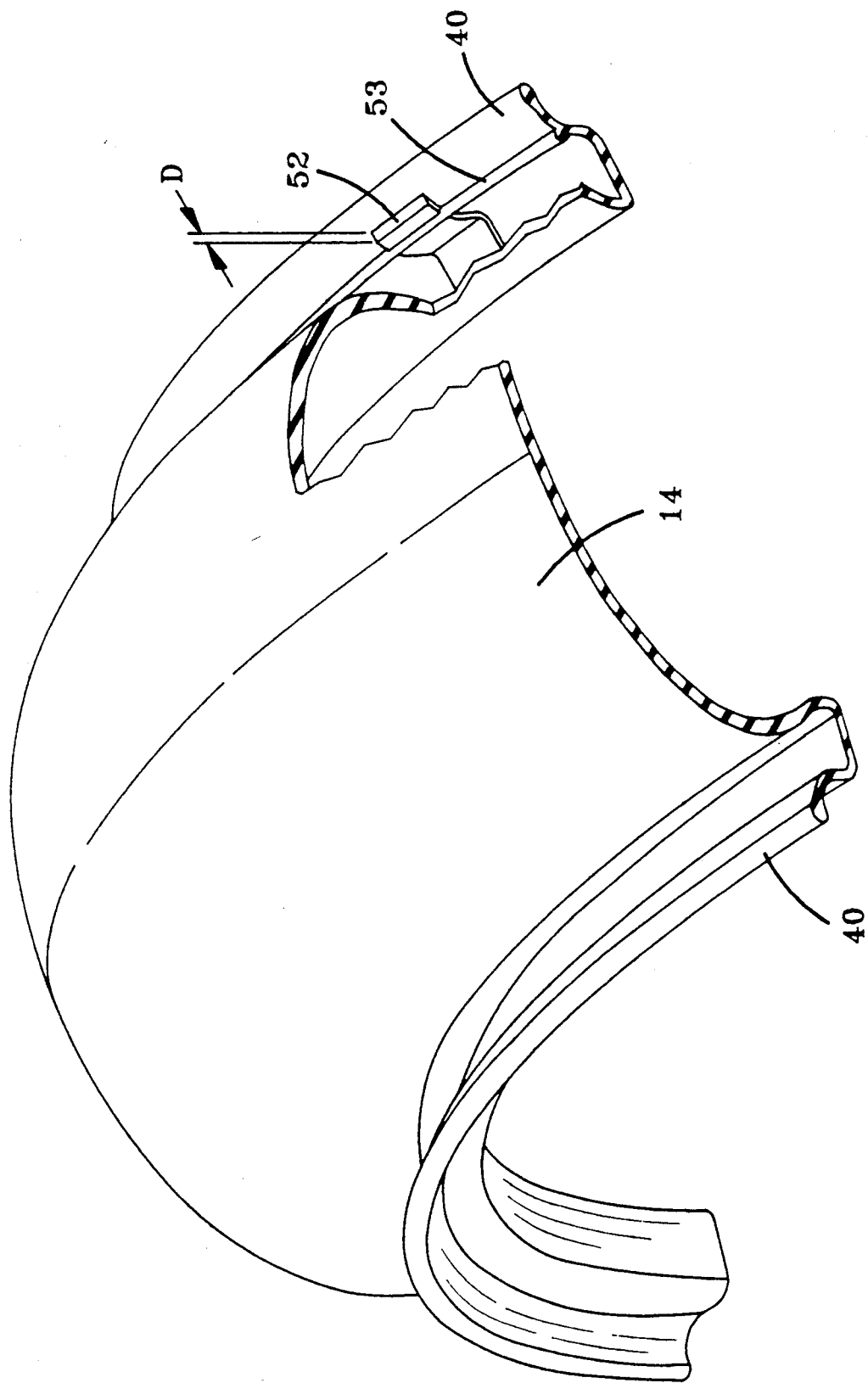
FIG. 6 is a partial perspective view of the outer tire of FIG. 3.

As illustrated in FIG. 3 and FIG. 6 the inner tire has at least one flange 40 with vent plugs 52.

The inner tire's vent plugs 52 further include an integrally molded annular "O"]ring type seal 53. The seal 53 intersects the vent plugs 52 and is designed to align with the "O" ring seat 51 of the outer tire 12.

In the preferred embodiment the annular "O" ring type seal is an integral part of the inner tire 14 formed with a semi-circular cross section having an 0.05 inch radius and extending axially 0.100 inches from the flange surface.

The "O" ring seal and seat portions of the vents and plugs provide radially restraints preventing relative movement of the inner and the outer tire in a radial direction upon assembly of the tires to the rim. Similarly the vents 50 and vent plugs 52 prevent circumferential relative movement of the inner and outer tires.

When the inner tire 14 is assembled to the outer tire 12 the vent plugs 52 are designed to be aligned with and seal the air vents 50 of the outer tire 12.

As further illustrated in FIG. 5 the air vents of the outer tire extend axially across the radially innermost surface of the bead portion and extend radially outwardly along the outer surface of the bead portion a distance approximately equal to the flange height of the rim.

The vents 50 have a recommended minimum depth D of at least 0.025 inch. In the preferred embodiment the depth of the vent 50 is uniformly set at 0.06 inch.

The vents 50 also have a recommended width W of 0.5 inches. It is recommended that at least four vents be provided in the bead portion of the outer tire.

Figure 7:
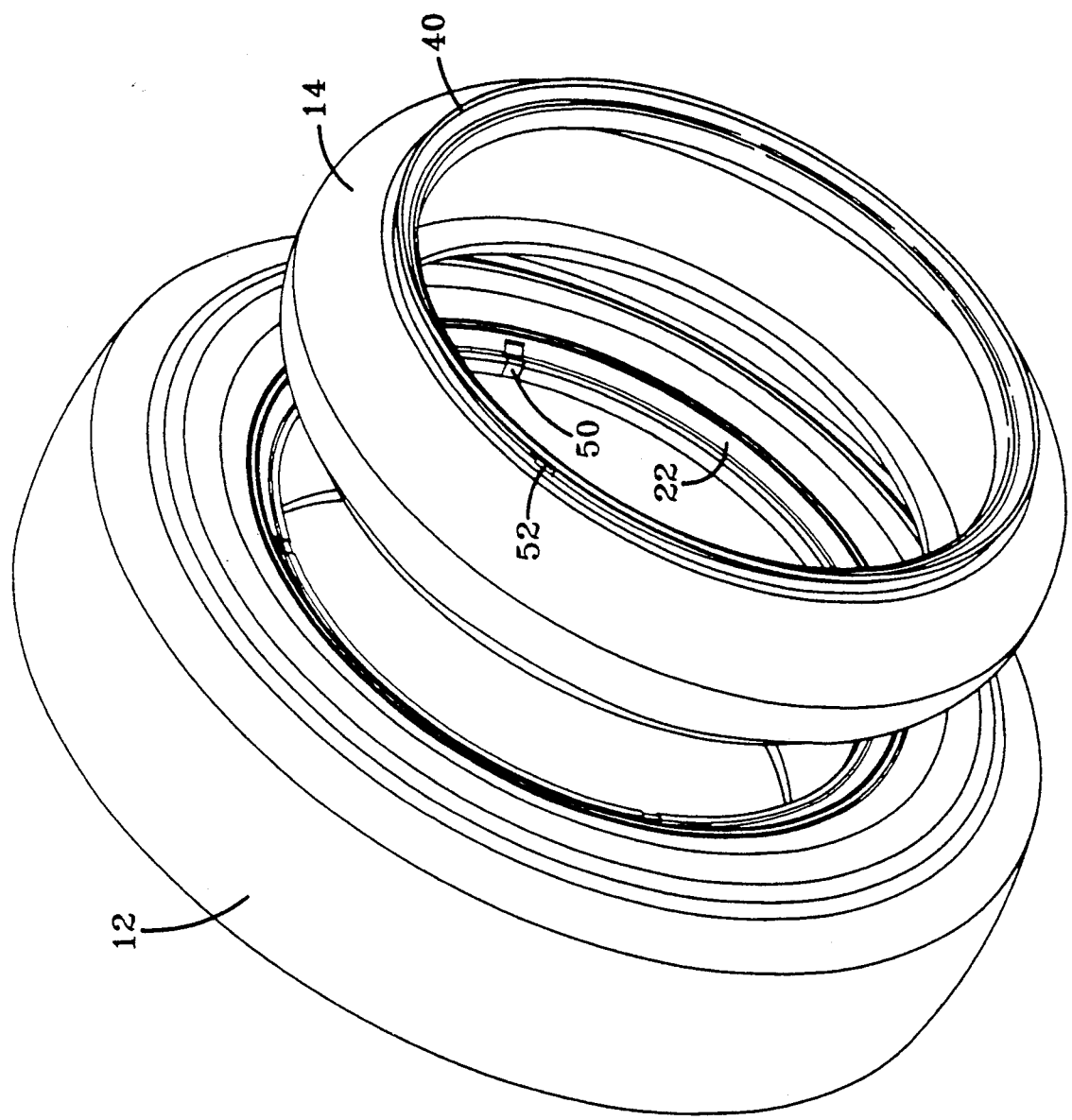
FIG. 7 is an exploded view of the tire assembly.

As illustrated in FIG. 7 one embodiment of an outer tire 12 designated 205/70 R15 has 4 of such vents 50 equally circumferentially spaced about one bead portion. The illustrated mating inner shield has a matched number of vent plugs 52.

The mating of the inner and outer tires in the region of the bead portion is further illustrated in enlarged view 4A. The mating of the vents 50 and the vent plug 52 is shown. The "O" ring 53 as well as the "O" ring seat 51 are also, illustrated. The vent plugs 52 are located on a flange and project from the flange in the region of the flange that encapsulates or surrounds a bead portion 22 of the outer tire 12. The vent plugs 52 project from the surface of the flange 40 a distance approximately equal to the depth D of the vents 50. The vent plugs also are correspondingly designed to fit and fill the air vents 50 of the outer tire without restricting the ability of the "O" ring 53 to seal against the "O" ring seat 51 in an air-tight manner.

In the preferred embodiment of the invention it is recommended that the inner tire 14 be permanently cemented or glued to the outer tire 12 in the area of the bead portions 22 and flanges 40. This insures that the tire assembly will be sold as a single unit, simplifies assembly, and further avoids the potential for inadvertently forgetting the inner tire. Although glueing is recommended the procedure is not required.

Providing vents 50 and plugs 52 on both bead portions and flanges, although considered to be within the scope of this invention, is not preferred. The use of vents 50 on both sides complicates assembly and alignment without further enhancing the desired objective of preventing inadvertent assembly of the outer tire absent the inner tire.

In one embodiment of the invention the inner tire is filled with a cellular foam. The foam filled inner tire provides additional runflat capability while avoiding the potential of puncturing and losing pressure in an air filled inner tire.

One penalty of using a foam filled inner tire is weight. In applications where vehicle movement is more important than weight the foam filled inner tire is preferred. In many military applications a preference for maintaining vehicle mobility exists.

Figure 8:
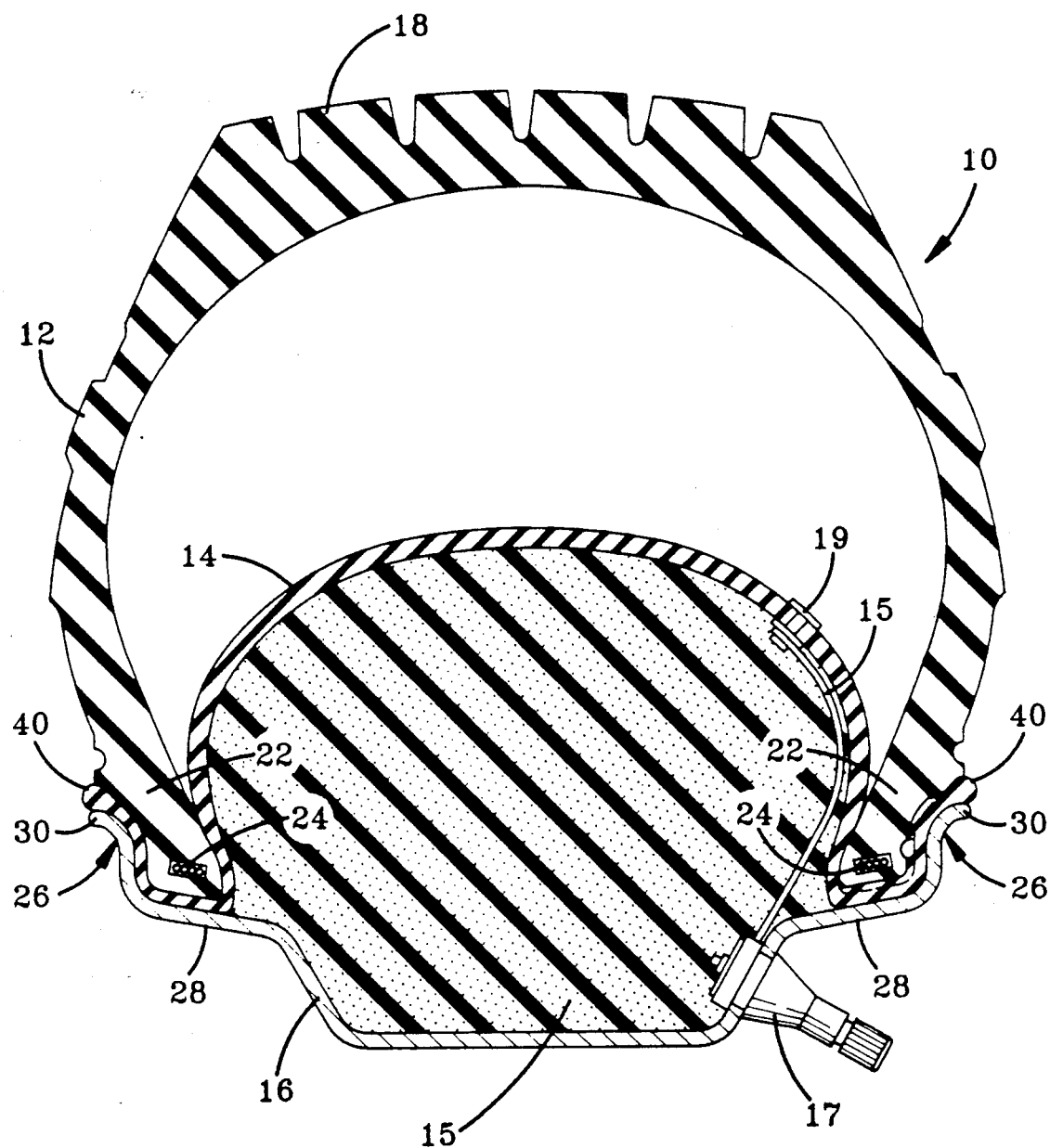
FIG. 8 is a cross sectional plan view of a tire assembly mounted on a rim, the inner tire being foam filled.

The tire of FIG. 8 illustrates a foam filled inner tire. The foam can comprise a urethane foam which is liquid filled into the inner tire chamber and combine with a catalyst which reacts with the urethane expanding the material and thus forming a cellular foam inner tire.

Alternatively, a layer of material can be placed in the inner tire chamber and upon application of a heat process a reaction occurs expanding the material into a cellular foam filling the inner tire chamber.

The method of foam filling an inner chamber is described by Robert Dobson in U.S. Pat. Nos. 4,418,734, and 4,751,951 and the method of foam filling a tire is further described in U.S. Pat. No. 3,915,774. The teachings of the above patents are incorporated by reference into the present application.

An alternative embodiment of the invention (not illustrated) has the outer tire 12 having a plurality of plugs and the inner tire 14 having vents. The plugs of the outer tire are of sufficient size to prevent the bead from sealing against a rim. This design although feasible, is not preferred. The flange of the inner tire is thin and would require an increase in thickness to provide vents of sufficient size to accommodate the plugs.

Another alternative design configuration is a combination of vents and plugs on the outer tire 12 with the inner tire having corresponding mating vents and plugs.

In each of the above described embodiments an "O" ring design may also be incorporated. The "O" ring could be a separate component, or alternatively an integrally molded part of the inner or the outer tire. The designs having an "O" ring may have a corresponding "O" groove in the mating parts to facilitate sealing upon assembly.

Various changes and modifications may be made in the subject matter disclosed without departure from the scope of the invention.

What is claimed is:

1. A tire assembly comprising:
    an outer tire, the outer tire being a tubeless pneumatic tire having an inner cavity and a pair of axially opposed bead portions; each bead portion including a bead seal region having a radially innermost sealing surface and an axially outer sealing surface;
    an inner tire, the inner tire being a tubeless pneumatic tire mounted in the inner cavity of the outer tire, the inner tire having a pair of flanges, the flanges encasing the bead portions of the outer tire; and
    wherein the outer tire has at least one vent extending axially across the radially innermost sealing surface and extending radially outwardly along the outer sealing surface of at least one bead portion and the inner tire has at least one plug which mates with the vent or vents of the outer tire upon assembly, air being permitted to escape from the outer tire through the vent or vents if an attempt is made to mount the outer tire on a rim without a mating inner tire.

2. The tire assembly of claim 1, wherein the outer tire has at least one plug and the inner tire has a mating vent or vents.

3. The tire assembly of claim 1, further comprising and "O" ring seal component positioned between the inner and outer tire in the bead seal region.

4. The tire assembly of claim 3, wherein the "O" ring is integrally molded with the inner tire.

5. The tire assembly of claim 3, wherein the "O" ring is integrally molded with the outer tire.

6. A tire assembly as in claim 1
    the outer tire having at lease one bead portion having a plurality of air vents integrally molded into the bead portion, and
    the inner tire having at least one flange having vent plugs equal in number to the vents of the outer tire, the vent plugs being aligned with and sealing the vents of the outer tire.

7. The tire assembly of claim 6 wherein the inner tire is cemented to the outer tire at the flange/bead interface.

8. The tire assembly of claim 6, wherein the vent plugs of the inner tire include an integrally molded "O" ring seal, and wherein the vents of the outer tire further include an annular O ring seat portion.

9. The tire assembly of claim 8 wherein the "O" ring portion of the inner tire is an annular ring located on a radially extending inner surface of a bead flange.

10. The tire assembly of claim 9 wherein the "O" ring projects outwardly from the flange and the plug surfaces.

11. The tire assembly of claim 1, wherein the inner tire is filled with a cellular foam.

* * * * *